July 19, 1966 S. BESPALKO ETAL 3,262,100

DATA PROCESSING APPARATUS

Filed Dec. 28, 1961 3 Sheets-Sheet 1

INVENTORS
STEPHEN BESPALKO
ESTOL C. LAMB
WALTER S. SCHAFFER

BY Donald F. Voss

ATTORNEY

July 19, 1966 S. BESPALKO ET AL 3,262,100

DATA PROCESSING APPARATUS

Filed Dec. 28, 1961 3 Sheets-Sheet 3

United States Patent Office 3,262,100

Patented July 19, 1966

3,262,100

DATA PROCESSING APPARATUS

Stephen Bespalko, Vestal, N.Y., Estol C. Lamb, Rockville, Md., and Walter S. Schaffer, Vestal, N.Y., assignors to International Business Machines Corporation, New York, N.Y., a corporation of New York Filed Dec. 28, 1961, Ser. No. 162,710
13 Claims. (Cl. 340—172.5)

This invention relates to data processing apparatus and particularly to data processing apparatus which enables data represented in a wide variety of codes to be converted or translated to a fixed code without providing a separate encoding or data translator unit for each particular code or adjusting any particular translator to enable it to translate a series of codes.

The invention facilitates the use of data input devices furnishing data in many different codes with a data processing unit operating according to a fixed code. This is accomplished by grouping the data channels utilized to represent data in coded form according to a code having a maximum number of data channels. The data channels of the groups of data channels are each assigned a new weight according to an arbitrary code to develop a series of characters as per the new code for each group of data channels. Whether or not a data input device furnishes data represented by the maximum number of data channels is immaterial because the maximum number of data channels will always be examined and grouped and this will always include a lesser number of data channels. The data characters generated for each group of data channels are then utilized as a key or address to seek the actual data represented in coded form according to the fixed code or the code of the central processing unit. By this arrangement, it is unnecessary to provide a translator to accommodate each particular code of each data input device. Additionally, for greater flexibility, a fixed character or group of characters can be combined with the key or address to permit the actual data to be placed in different locations or places.

Generally, the actual data to be entered into the central processing unit is located in a series of positions within a data storage device. The key or address is then utilized to locate this actual data in the data storage device. The particular way in which this is done depends upon the means for retrieving data from the storage device. In some instances, the key or address can directly locate the actual data in storage, and in response to locating the data, the same is automatically transferred from the data storage device. Of course, it is also possible to constantly furnish the data in each storage position or location to a device, such as an electronic gate, which is rendered operable only by the key or address to pass the data.

Accordingly, a prime object of the invention is to provide apparatus which enables data represented in a wide variety of codes to be converted or translated into a fixed code.

Another very important object of the invention is to provide apparatus which develops a key or address from a plurality of data channels without regard to the code utilized to represent characters according to data on the channels.

Another very important object of the invention is to provide apparatus for translating data which is relatively inexpensive.

The foregoing and other objects, features and advantages of the invention will be apparent from the following more particular description of preferred embodiments of the invention, as illustrated in the accompanying drawings.

*General*

Figure 1:
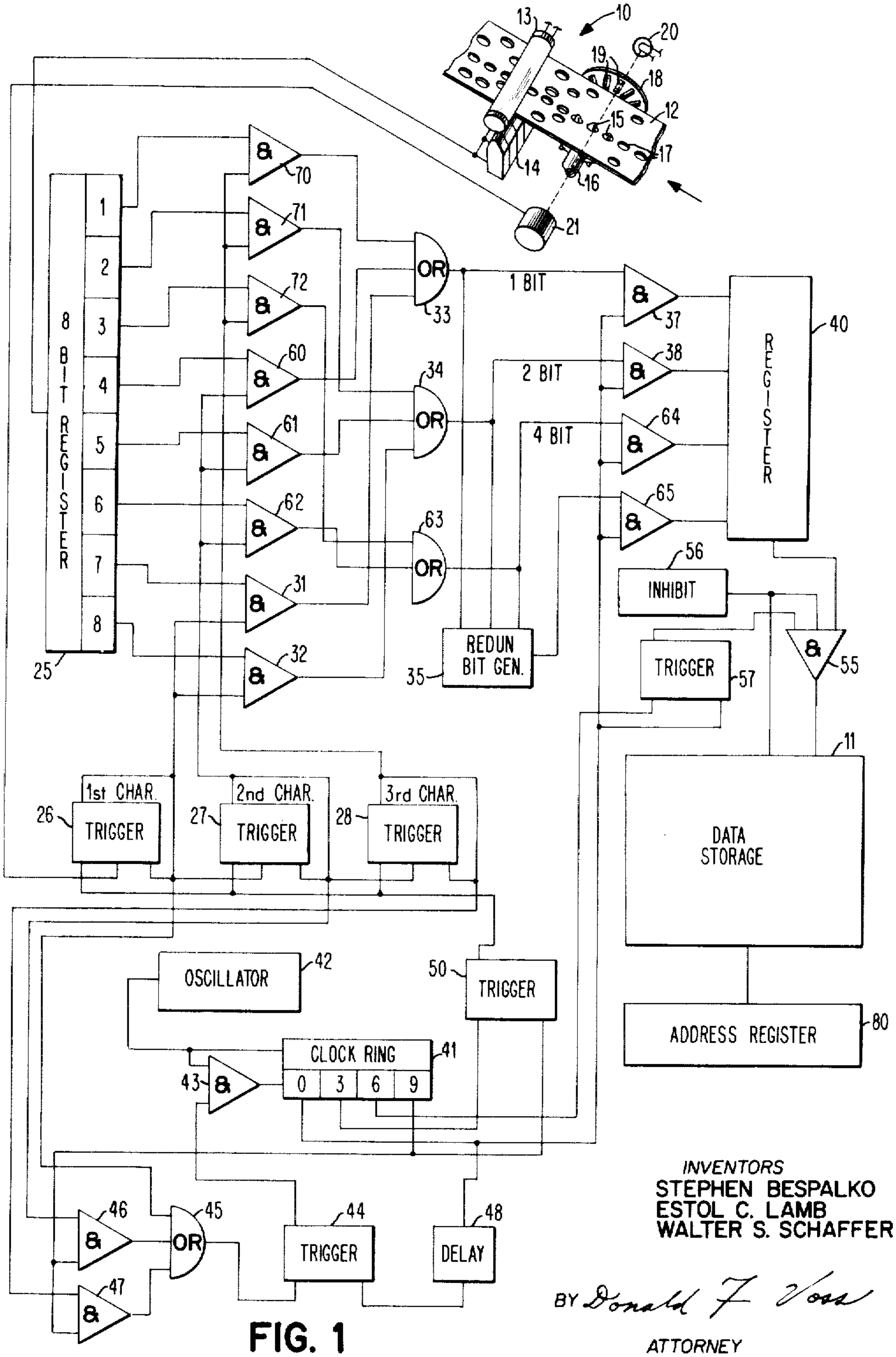
FIG. 1 is a schematic diagram illustrating the invention in a general manner.
Figure 2:
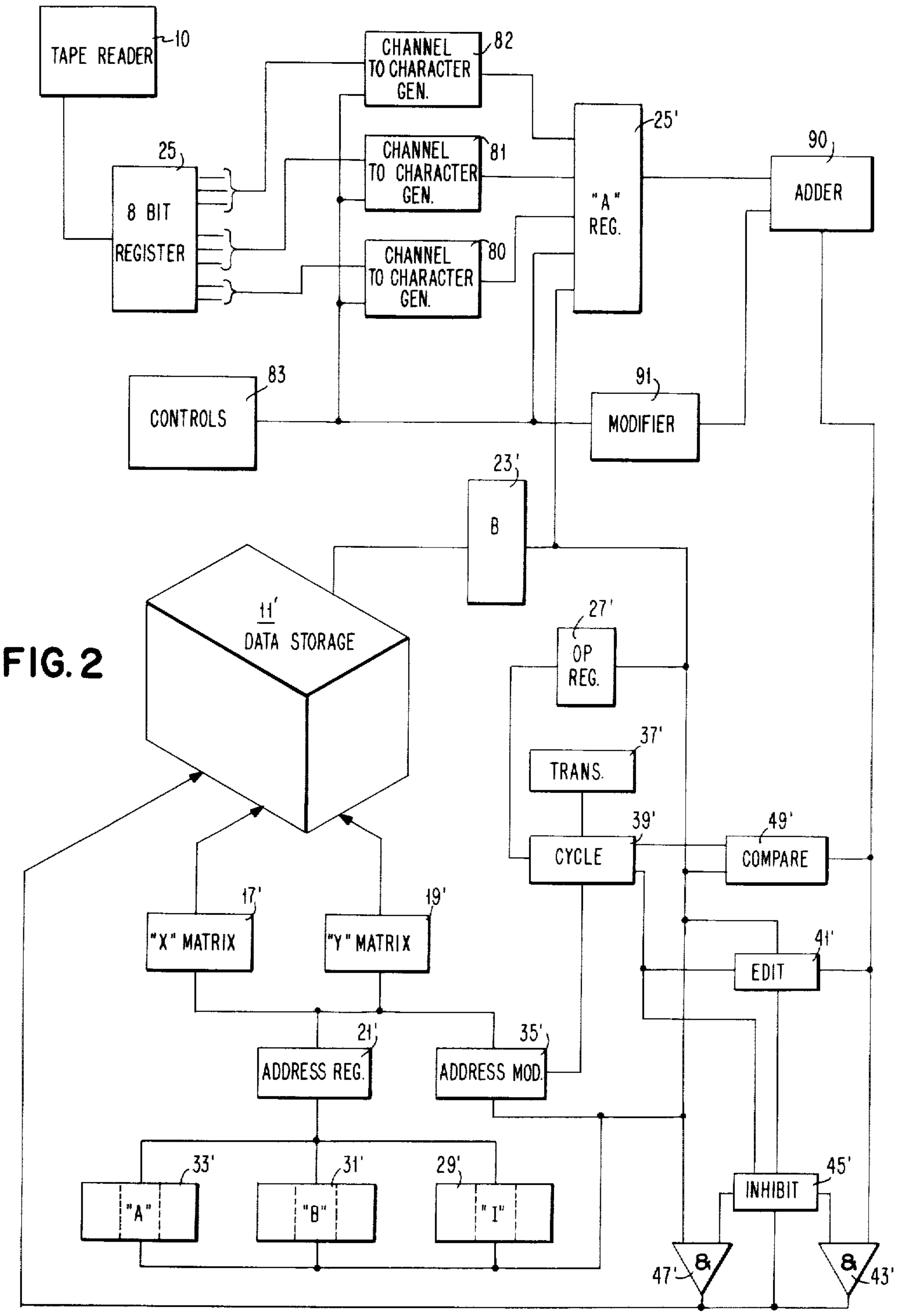
FIG. 2 is a schematic diagram illustrating the invention in conjunction with a data processing system; and, FIG. 3 is a timing diagram.

The invention is illustrated by way of example in FIG. 1 in a rather general manner. In FIG. 2, the invention is illustrated also by way of example as being utilized in conjunction with a data processing system shown and described in U.S. patent application Serial No. 838,457, now Patent No. 3,077,580, by F. O. Underwood which is assigned to the assignee of the present invention.

Irrespective of the use made of the invention, the underlying principles remain the same in each instance of use. The maximum number of data channels are divided or separated into groups. The data channels within a group are each assigned a particular weight according to a predetermined arbitrary code. In the particular examples to be given, the data channels are divided into three groups. The number of groups may vary and generally are chosen as to the address or method used for locating a data character in data storage. Hence, in effect, each character coming from the input device is developed into three characters. These three characters are then utilized as a key or address to locate a single data character for representing the same data character as coming from the input device, but in a different code.

The three character key or address can be used immediately to locate the data character in the new code or it can be entered into data storage and subsequently read out, as, for instance, under program control to locate the data character.

In the particular example to be given, data can be represented by the use of a maximum of eight data channels. Known codes involving the use of four, five, six, seven and eight channels can be used for representing the input data. This input data, as represented by any one of these codes is entered into data storage to facilitate subsequent transfer to a central data processing unit operating according to a fixed code by developing an address for locating the translated data which is contained in data storage. For example, 5-channel paper tape, according to the well-known telegraphic code, utilizes data bits in channels 1, 4 and 5 to represent a "W." These five channels only form a portion of the key or address because, for this example, a maximum of eight data channels is always examined. As it will be seen later herein, the eight channels, where five of the channels are used to represent a "W" according to the telegraphic code will be grouped into three groups to generate an address 371. The data bits at address 371 will also represent a "W" but according to the fixed code of the computer which, in this instance, is the well-known modified binary coded decimal code; the bits being 2, 4 and A of the possible bits 1, 2, 4, 8, A, B, C. Depending upon the number of holes read in the paper tape and the remaining channels to be examined to complete the scanning of eight channels, the three character address can vary from 000 to 377, because of the arbitrary code chosen to develop the three character address. Of course, this three character address may be modified by adding a constant to it to locate the translated data in storage at different storage locations. With this general information as background, a detailed description will now be given.

*Detailed description*

With reference to FIG. 1, data read by paper tape reader 10 is to be entered into data storage 11. However, according to this invention, all possible characters which can be read by the reader 10 are already contained in data storage, and it then becomes a matter of locating in storage the particular data character corresponding to the data character read by the tape reader 10. This is accomplished by taking the data read by the tape reader 10 and developing an address for locating the data in storage which, in this instance, will be in a different code, the code being any fixed code, such as the code of a central processing unit.

Figure 3:
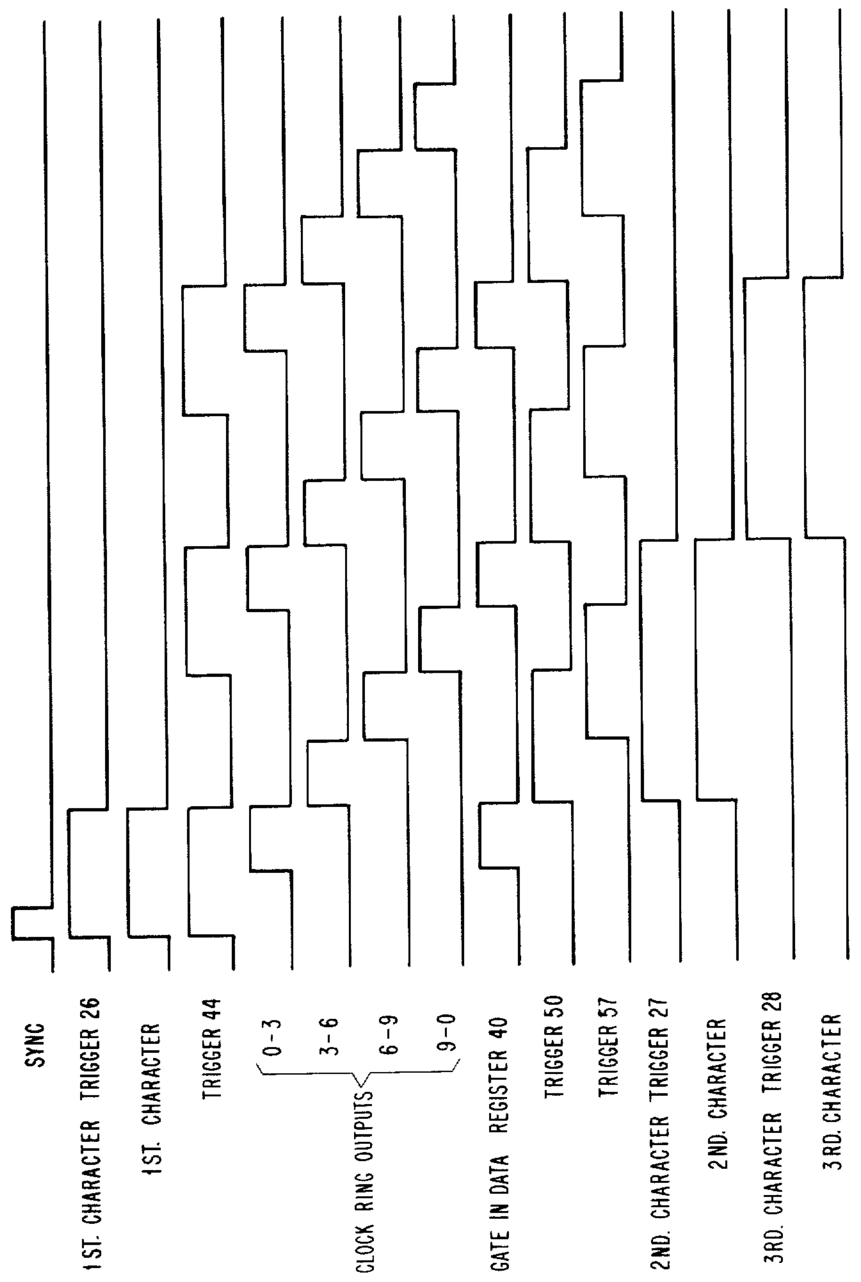

The paper tape reader 10 is schematically shown, and it includes means for driving perforated tape 12 relative to a light source 13 and light responsive sensing elements 14. In this example, there are eight light sensitive elements 14 in juxtaposition with each other. The tape 12 is moved as pins 15 of a sprocket wheel driven by shaft 16 engage feed holes 17 of the paper tape 12. The means for driving shaft 16 is not shown. The shaft 16 also drives a timing disk 18 which has a plurality of arcuately spaced slots 19 for permitting light waves from light source 20 to pass therethrough and impinge upon a light responsive element 21. The timing disk 18 generates an electrical impulse for each character position on the tape 12. This electrical timing impulse is designated as a "sync impulse," as shown in FIG. 3. In this particular example, paper tapes having a maximum of eight channels can be used. A 5-channel tape is shown in FIG. 1 for purposes of illustration.

Since a maximum of eight channels can be sensed by the paper tape reader 10, there are eight light responsive sensing elements 14. If less than an 8-channel tape is being sensed, the light source 13 constantly energizes those light responsive elements 14 which are not covered by the paper tape 12. The outputs of the light sensitive sensing elements 14 are connected to inputs of an 8-bit register 25. Combinations of bits of data in register 25 are utilized to represent a single data character. However, the single data character contained in register 25 is utilized to develop three data characters to generate an address for locating its equivalent translated data in data storage 11. The three data characters for forming the address are generated serially through the facility of first, second and third character triggers 26, 27 and 28, respectively.

The first character trigger 26 is adapted to be set by the sync pulse generated by the light responsive element 21 which has its output connected to the set terminal of trigger 26. With the trigger 26 set, the first character of the three character address is generated by examining bit positions 7 and 8 of the bit register 25. Additionally, the character so formed is transmitted to data storage 11 under control of timed electrical impulses which are initiated under control of the first character trigger 26.

The outputs of positions 7 and 8 of the 8-bit register 25 are connected to inputs of logical AND circuits 31 and 32, respectively. The logical AND circuits 31 and 32 are adapted to be conditioned by the first character trigger 26 which has its output connected to the inputs thereof, respectively. The output of logical AND circuit 31 is connected to an input of a logical OR circuit 33, and the output of logical AND circuit 32 is connected to an input of a logical OR circuit 34. The output of logical OR circuit 33 is connected to a conductor designated "1 bit," while the output of logical OR circuit 34 is connected to a conductor designated "2 bit." Hence, depending upon the condition of the bit positions 7 and 8 of the register 25, the character generated can be 0, 1, 2 or 3. The 1 bit line and the 2 bit line are connected to inputs of a redundant bit generator 35 which is utilized to examine the bit conditions of these lines and generate a checking bit if necessary. The 1 bit line and 2 bit line are also connected to inputs of logical AND circuits 37 and 38, respectively. The outputs of logical AND circuits 37 and 38 are connected to a single character register 40. Logical AND circuits 37 and 38 are conditioned from a timing pulse coming from a clock ring 41.

Clock ring 41 is adapted to be advanced by electrical impulses coming from an oscillator 42. The electrical impulses from oscillator 42 cannot advance the stages of the clock ring 41 unless the first stage of the clock ring has been set. The setting of the first stage of the clock ring 41 is under control of a logical AND circuit 43 which has an input connected to the output of the oscillator 42 and an input connected to the output of a control trigger 44. The set terminal of control trigger 44 is connected to the output of a logical OR circuit 45. Logical OR circuit 45 has one input connected directly to the output of the first character trigger 26, and inputs connected to outputs of logical AND circuits 46 and 47. By this arrangement, the setting of the first character trigger 26 effects the setting of the control trigger 44 via logical OR circuit 45. The control trigger 44 is reset by a signal from the first position of the clock ring 41 which is connected to a delay element 48 which has its output connected to the reset terminal of trigger 44. The four positions of the clock ring 41 are arbitrarily designated to represent 0 to 3 time, 3 to 6 time, 6 to 9 time and 9 to 0 time. The output of the first position of the clock ring 41 is connected to condition logical AND circuits 37 and 38 to gate the first character into register 40.

The setting of the first character trigger 26 conditions the setting of the second character trigger 27. The second position of clock ring 41 has its output connected to the set terminal of an advance trigger 50. The advance trigger 50 has its reset terminal connected to the fourth position of the clock ring 41. The advance trigger 50 initiates another cycle for generating a character by bringing up the second character trigger 27; however, the clock ring 41 still continues to advance under impulses from oscillator 42. The output of trigger 27 is connected to an input of logical AND circuit 46 which is not conditioned until 9 time by the fourth position of the clock ring 41. Hence, while the trigger 50 is set at 3 time, the control trigger 44 will not be set again until 9 time.

The first character entered into register 40 is transferred to data storage 11 under control of a logical AND circuit 55 which has an input connected to the output of register 40, an input connected to an inhibit control 56 and an input connected to the output of a trigger 57. The inhibit control 56 functions to control the entry of data into data storage 11 which, for example, can be magnetic core storage; and both the inhibit control 56 and the data storage 11 can be of the type shown and described in the above-mentioned application to Underwood. Trigger 57 has its set terminal connected to the third position and its reset terminal connected to the first position of the clock ring 41. Hence, the character gated into register 40 at 0 time is gated out of the register 40 at 6 time into data storage 11.

The generation of the second character of the address is under control of trigger 27. The second character of the address is formed from channels 4, 5 and 6. The outputs for positions 4, 5 and 6 of the bit register 25 are connected to inputs of logical AND circuits 60, 61 and 62, respectively. Logical AND circuits 60, 61 and 62 each have an input connected to the output of the second character trigger 27. The output of logical AND circuit 60 is connected to an input of logical OR circuit 33, the output of logical AND circuit 61 is connected to an input of logical OR circuit 34, and the output of logical AND circuit 62 is connected to an input of logical OR circuit 63. The output of logical OR circuit 63 is connected to a conductor designated "the 4 bit line" which is also connected to an input of the redundant bit generator 35 and to an input of a logical AND circuit 64. The output of the redundant bit generator 35 is connected to an input of a logical AND circuit 65. Logical AND circuits 64 and 65, like logical AND circuits 37 and 38, have inputs connected to the first position of the clock ring 41. By this arrangement, depending upon the conditions of the bit positions 4, 5 and 6, the second character generated can have a value from 0 to 7.

The setting of the second character trigger 27 effects the setting of the control trigger 44 via logical AND circuit 46 and logical OR circuit 45 which permits the clock ring 41 to continue to run. Consequently, the second character of the address will be gated into the register 40 from 0 to 3 time and will be gated into data storage 11 during 6 to 0 time. Advance trigger 50 will be again set at 3 time to cause the setting of the third character trigger 28, the same having been conditioned for being set upon the second character trigger 27 having been set. It should be noted that the control trigger 44 could not be set until 9 time because the output of the fourth position of the clock ring 41 is connected to an input of logical AND circuit 46.

The third character trigger 28 controls the generation of the third character which is generated from the channels 1, 2 and 3 of the tape 12. The outputs of the bit positions 1, 2 and 3 of bit register 25 are connected to inputs of logical AND circuits 70, 71 and 72, respectively, each having an input connected to the output of the third character trigger 28. The output of logical AND circuit 70 is connected to an input of logical OR circuit 33, the output of logical AND circuit 71 is connected to an input of logical OR circuit 34, and the output of logical AND circuit 72 is connected to an input of logical OR circuit 63. Hence, the third character generated can have a value from 0 to 7. The third character so formed is gated into register 40 at 0 time and into data storage 11 during 6 to 0 time.

The characters generated for forming the address can subsequently be read from data storage 11 by means of an address register 80 and be utilized to address the storage location containing the translated data for the data character read from tape 12. The translated data character can then be read to a central processing unit such as of the type disclosed in the application to Underwood, identified above.

In FIG. 2, register 25' is substantially the same as register A of the Underwood application. Data read from tape reader 10 is entered into the 8-bit register 25. Logical AND circuits 31, 32, 37, 38, 60, 61, 62, 64, 65, 70, 71 and 72 and logical OR circuits 33, 34 and 63 of FIG. 1 are replaced by three channel-to-character generators 80, 81 and 82 in FIG. 2. The character triggers 26, 27 and 28, clock ring 41 and the other timing controls of FIG. 1 are replaced by controls 83 in FIG. 2. Data characters entered into register 25', FIG. 2, are entered into data storage 11' according to the manner described in the Underwood application. Additionally, the data entered into register 25' can be modified prior to being entered into data storage 11'. The output of the register 25' is shown as being connected to one input of a single digit adder 90 also having an input from a modifier 91. The controls 83 control the simultaneous transfer of characters from register 25' and modifier 91 to the adder 90. The modifier 91, in this example, can be a data register having any number of digits which are transferred one at a time to the adder 90. By this arrangement, the three character address can be modified according to a predetermined manner to locate the translated data in data storage 11'. The elements in FIG. 2 which are identical to those of the Underwood application of FIG. 1 thereof are identified by like reference characters; however, with the reference characters being primed so as to distinguish from the reference characters of the present application.

In FIG. 2, the characters coming from register 25' are shown as being modified by adder 90 prior to entry into data storage. It is also possible to enter the characters for register 25' directly into data storage 11 and subsequently read out these characters and read out a modifier stored in data storage 11 to the B register 23', and subsequently transfer these characters to a 1-digit adder, not shown, and store the results in data storage 11. The result can then subsequently be read out from data storage 11 and address the location containing the translated data.

*Mode of operation*

As the tape 12, FIG. 1, moves relative to light source 13 and light responsive elements 14, a sync impulse shown in FIG. 3 is generated by light waves from light source 20 impinging upon light sensitive element 21 as the light waves are permitted to pass by the timing disk 18. The sync impulse sets the first character trigger 26. Assume that the character in the tape 12 being sensed at this character time is a "W" which is represented by a perforation in channels 1, 4 and 5. Additionally, since a 5-channel tape is being sensed, light sensitive elements 14 for positions 6, 7 and 8 will be exposed to the light source 13. Consequently, bit positions 1, 4, 5, 6, 7 and 8 of bit register 25 will be set. The first character trigger 26 permits the bit representations in bit positions 7 and 8 to transfer via logical AND circuits 31 and 32 and logical OR circuits 33 and 34 to logical AND circuits 37 and 38, respectively. With the first character trigger 26 set, the control trigger 44 will be set and the clock ring 41 will be set in the first position. With the clock ring 41 set in the first position, a first character will be entered into register 40 because the logical AND circuits 37 and 38 will be conditioned to pass the bit representations on the 1 bit and 2 bit lines. Accordingly, a character "3" will be entered into register 40. The character "3" will be transferred from register 40 to data storage 11 via logical AND circuit 55 which is conditioned by inhibit 56 and by the trigger 57. The trigger 57 is set at 6 time by clock ring 41.

The second character trigger 27 is conditioned to be set by the first character trigger and is set when the trigger 50 is set. Trigger 50 is set at 3 time. However, while the second character trigger 27 is set at 3 time, the control trigger 44 will not be set immediately because the logical AND circuit 46 will not be conditioned until 9 time. The second character trigger 27 conditions logical AND circuits 60, 61 and 62 to pass the bit representations of bit positions 4, 5 and 6 of bit register 25. Since the bit positions 4, 5 and 6 of bit register 25 each contains a bit of data, the 1 bit, 2 bit and 4 bit lines will each have bit representations; and, upon the logical AND circuits 37, 38 and 64 being conditioned by the clock ring 41 at 0 time, a character "7" will be entered into register 40. The character "7" will be gated out of register 40 under control of logical AND circuit 55 and entered into data storage 11 during 6 to 0 time. The trigger 50, having been reset at 9 time of the first character cycle, is set at 3 time of the second character cycle and the third character trigger 28, having been conditioned by the second character trigger 27, is then set by the trigger 50. Again, while the third character trigger 28 is set at 3 time, logical AND circuit 47 is not conditioned until 9 time to effect the setting of the control trigger 44.

With the third character trigger 28 set, the bit positions 1, 2 and 3 of the bit register 25 will be examined. The bit position 1 is the only position of these three bit positions containing a bit of data. Accordingly, only the 1 bit line will be energized and a character "1" is entered into the register 40 as the logical AND circuit 37 is conditioned at 0 time by clock ring 41. The character "1" is then transferred from the register 40 under control of logical AND circuit 55 to data storage 11 at 6 to 0 time. A three character address 371 is now contained in data storage 11. The three character address 371 can then be read from storage and be used to address location 371 which contains bits 2, 4 and A of the possible bits 1, 2, 4, 8, A, B and C to represent a "W" in the binary coded decimal code. These bits in the addressed storage location 371 can then be transferred to a central processing unit adapted to process data according to the binary coded decimal code.

Assume it is desirable to locate the translated data character in address 771 of data storage instead of 371. A modifier "400" would be placed in modifier 91, FIG.

2, with the high order digit being read out first; and, as the "3" is transferred from register 25' to adder 90, a "4" would be transferred from modifier 91. The character "3" and character "4" would be combined by the adder 90 to form a character "7" which is transferred to data storage 11. As the second character "7" of the address 371 is transferred from register 25' to adder 90, a "0" is transferred to adder 90 from modifier 91. The combination of these two digits results in a "7" which is again transferred to data storage 11. As the "1," which is the last character of the three character address, is transferred from register 25' to adder 90, another "0" is transferred from modifier 91 to the adder 90. The character "1" is combined with the "0" transferred from modifier 91, and the result which is a character "1" is entered into data storage 11. The address now in data storage is 771. This address can then be read from data storage 11 and utilized to address position 771 which contains the translated data which, in this instance, would be the bits 2, 4 and A to represent a "W" in the binary coded decimal code.

In order to fully appreciate the versatility of the present invention, an example will be given for 8-channel tape. A "W" is represented by perforations in channels 2, 3 and 6 for an 8-channel tape. The address generated, as it will be seen shortly, is 046. Since there are no perforations in channels 7 or 8, and an 8-channel tape is being used, there will not be any bits set in bit positions 7 and 8 of bit register 25, FIG. 1. Accordingly, the first character entered into register 40 will be a zero. This character will be entered into data storage 11 in a manner previously described. According to the example given, bit positions 4 and 5 of the register 25 will not contain a bit while bit position 6 does. These conditions will cause a four bit to be entered into register 40, thereby representing a character "4" which is subsequently entered into data storage 11. Bit position 1 of the register 25 does not contain a bit while bit positions 2 and 3 do; therefore, a "6" will be entered into register 40; i.e., the combination of bits 4 and 2. The character "6" will then be read from register 40 and entered into data storage 11. Address 046 will then be used to locate the position in storage 11 which contains the translated data; i.e., the bits 2, 4 and A to represent a "W" in the binary coded decimal code.

From above, it is thus seen that the same apparatus is capable of effecting a translation from 5-channel tape to binary coded decimal code as that utilized to translate 8-channel tape. Further, from the foregoing, it is seen that the invention develops a key or address from a plurality of data channels without regard to the code utilized to represent the characters according to data on the channels. This address is then utilized to locate the translated data. Additionally, it is seen from the foregoing that the invention provides apparatus for translating data which is relatively inexpensive.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Data processing apparatus comprising:

a data register having a predetermined number of bit positions;

a data source connected to said register to provide real and dummy data bits thereto to facilitate loading said register with all real bits in one instance and with a combination of real and dummy bits in other instances where said real bits represent data according to a plurality of different codes and said dummy bits fill those bit positions of said data register unoccupied by real bits; and means connected to said register to develop a multiple character address according to a predetermined code from both the real and dummy bits to facilitate addressing a particular predetermined position in an addressable storage.

2. Data processing apparatus according to claim 1 further comprising:

(a) an addressable data storage having a plurality of positions for storing data characters represented by bits of data, and (b) means for transferring said developed address into predetermined positions of said data storage.

3. Data processing apparatus as in claim 2 wherein said data storage comprises a magnetic core matrix.

4. Data processing apparatus comprising:

(a) a data register having a number of bit positions corresponding to a predetermined maximum number for representing characters according to a plurality of codes, (b) a data source connected to said register to provide real and dummy data bits thereto to facilitate loading said register with all real bits in one instance and with a combination of real and dummy bits in other instances where said real bits represent data according to a plurality of different codes and said dummy bits fill those bit positions of said data register unoccupied by real bits, (c) an addressable data storage having a plurality of storage positions each for representing data according to a fixed code, (d) groups of channel-to-character translators connected to corresponding groups of bit positions of said data register, and, (e) data receiving means for receiving characters from said character translators to make the same available for addressing a particular predetermined storage position.

5. Data processing apparatus according to claim 4 wherein said character translators are rendered operative in a time sequence.

6. Data processing apparatus according to claim 4 further comprising:

(a) means for entering the characters from said data receiving means into predetermined positions of said addressable data storage.

7. Data processing apparatus according to claim 6 further comprising:

(a) means for modifying the characters by constants as the same are transferred from said data receiving means to said data storage.

8. Data processing apparatus comprising:

(a) a paper tape reader for reading coded data entered into paper tape in the form of perforations in discrete channels, said paper tape reader having means for sensing a paper tape having a maximum number of data channels;

(b) a data register having a number of bit positions corresponding to said maximum number of data channels;

(c) means for entering bits of data into said data register in response to said sensing means of said paper tape reader sensing a paper tape;

(d) means for entering bits of data in said data register in those bit positions of said register corresponding to the channels exceeding the number of data channels of a tape having less than said maximum number of data channels;

(e) an addressable data storage having a plurality of data storage positions, each for representing a data character by bits of data according to a predetermined code;

(f) groups of channel-to-character translators connected to corresponding groups of bit positions of said data register;

(g) data receiving means for receiving characters from said character translators to make the same available for addressing a particular predetermined storage position; and (h) means for entering characters from said data receiving means into predetermined positions of said addressable data storage.

9. Data processing apparatus as in claim 8 further comprising:

(a) data combining means for combining data characters furnished thereto;

(b) means connecting said data receiving means to one input of said data combining means;

(c) a data modifier connected to another input of said data combining means, said modifier furnishing a predetermined data character to said data combining means as a character is furnished thereto from said data receiving means; and (d) means for connecting the output of said data modifier to said data storage to enter the combined data into predetermined positions of said addressable data storage.

10. Data processing apparatus comprising:

a data register having a predetermined maximum number of positions for representing a character of data according to a plurality of codes, means for entering any of a plurality of differently coded single data characters into said register, means for entering data bits into those positions of said register exceeding the number of bit positions utilized for any one code, and selectively operable means connected to said register for developing a predetermined number of characters represented according to a predetermined code from the single coded character entered into said register and any bits entered into said register exceeding the bit positions utilized for representing said single coded character.

11. The data processing apparatus of claim 10 wherein said selectively operable means develops three characters represented in binary coded decimal form.

12. The data processing apparatus of claim 10 wherein said selectively operable means develops said predetermined number of characters serially by character.

13. Data processing apparatus comprising:

a data register having eight bit positions for representing a character of data according to a plurality of codes, first, second and third data bit lines for representing data according to a fixed predetermined code, first gating means having inputs connected to bit positions seven and eight of said register and outputs connected to said first and second bit lines, second gating means having inputs connected to bit positions four, five and six of said register and outputs connected to said first, second and third data bit lines, third gating means having inputs connected to bit positions one, two and three of said register and outputs connected to said first, second and third data bit lines, and means for sequentially operating said first, second and third gating means whereby three coded characters are sequentially generated, the first character being generated from bit positions seven and eight and having a value determined by the condition of said first and second bit lines at that time, a second character being generated from bit positions four, five and six of said register and having a value determined by the condition of said first, second and third data bit lines at the corresponding time, the third character being generated from bit positions one, two and three of the register and having a value determined by the condition of said first, second and third data bit lines at the corresponding time.

References Cited by the Examiner

UNITED STATES PATENTS

| | | | |
|---|---|---|---|
| 2,916,210 | 12/1959 | Selmer | 235—157 |
| 3,008,127 | 11/1961 | Block et al. | 340—347 |

ROBERT C. BAILEY, *Primary Examiner.*

MALCOLM A. MORRISON, *Examiner.*

K. R. STEVENS, P. J. HENON, *Assistant Examiners.*